(12) United States Patent
Kramer et al.

(10) Patent No.: US 6,867,510 B2
(45) Date of Patent: Mar. 15, 2005

(54) MEMORY MIRROR SYSTEM FOR VEHICLES

(75) Inventors: Mark E. Kramer, Zeeland, MI (US); Roger L. Veldman, Holland, MI (US)

(73) Assignee: Donnelly Corporation, Holland, MI (US)

(*) Notice: Subject to any disclaimer, the term of this patent is extended or adjusted under 35 U.S.C. 154(b) by 59 days.

(21) Appl. No.: 10/274,745

(22) Filed: Oct. 21, 2002

(65) Prior Publication Data

US 2003/0034752 A1 Feb. 20, 2003

Related U.S. Application Data

(63) Continuation of application No. 10/052,181, filed on Jan. 17, 2002, now Pat. No. 6,472,773, which is a continuation of application No. 09/737,911, filed on Dec. 15, 2000, now Pat. No. 6,340,849, which is a continuation of application No. 09/448,690, filed on Nov. 24, 1999, now Pat. No. 6,163,083, which is a continuation of application No. 09/135,375, filed on Aug. 17, 1998, now Pat. No. 6,093,976, which is a continuation of application No. 08/818,918, filed on Mar. 17, 1997, now Pat. No. 5,796,176, which is a continuation-in-part of application No. 08/679,681, filed on Jul. 11, 1996, now Pat. No. 5,798,575.

(51) Int. Cl.$^7$ .................................................. B60L 1/00
(52) U.S. Cl. ...................... 307/10.1; 307/9.1; 340/654; 359/877
(58) Field of Search ........................ 307/10.1; 340/654; 359/877

(56) References Cited

U.S. PATENT DOCUMENTS

| | | | |
|---|---|---|---|
| 3,680,951 A | 8/1972 | Jordan et al. | |
| 4,451,887 A | 5/1984 | Harada et al. | |
| 4,698,571 A | 10/1987 | Mizuta et al. | |
| 4,707,788 A | * 11/1987 | Tashiro et al. | ................. 701/49 |

(List continued on next page.)

FOREIGN PATENT DOCUMENTS

| | | |
|---|---|---|
| DE | 3722348 A | 10/1988 |
| DE | 4141504 | 8/1992 |
| EP | 0274848 A1 | 7/1988 |
| EP | 0294791 A2 | 12/1988 |
| EP | 0396089 A1 | 4/1990 |
| EP | 0433531 A1 | 6/1991 |
| EP | 0867795 A1 | 9/1998 |
| FR | 2366958 | 5/1978 |
| GB | 2090017 A | 6/1982 |
| GB | 2315136 A | 1/1998 |
| WO | WO9605080 | 2/1996 |
| WO | WO9616838 A1 | 6/1996 |

OTHER PUBLICATIONS

Commonly assigned co-pending U.S. Appl. No. 10/251, 323, filed on Sep. 20, 2002, entitled Rear Vision System for a Vehicle Equipped with a Vehicle Communication Network (DON01 P-988).

(List continued on next page.)

*Primary Examiner*—Robert L. DeBeradinis
(74) *Attorney, Agent, or Firm*—Van Dyke, Gardner, Linn & Burkhart, LLP

(57) ABSTRACT

A vehicle memory mirror system includes a vehicle mirror assembly and a control module. The vehicle mirror assembly includes a reflective element, a motor for positioning the reflective element about an axis, a monitor for monitoring the position of the reflective element with respect to the axis, and a mirror-based control including a position control which is operatively connected with the motor and the monitor in order to position the reflective element at a particular position. The control module is interconnected with the mirror-based control by an analog interface and includes a processor for providing analog signals on the analog interface indicative of a desired position of the reflective element with respect to the axis. The mirror-based control preferably includes a servo-amplifier circuit. The control module can control the speed of movement by formatting a series of sequential signals on the interface, each representing an incremental movement of the reflective element.

34 Claims, 11 Drawing Sheets

U.S. PATENT DOCUMENTS

| | | | |
|---|---|---|---|
| 4,793,690 A | | 12/1988 | Gahan et al. |
| 4,811,226 A | | 3/1989 | Shinohara |
| 4,871,953 A | * | 10/1989 | Anstee ........................ 318/466 |
| 4,883,974 A | | 11/1989 | Tinder |
| 4,886,960 A | | 12/1989 | Molyneux et al. |
| 4,917,477 A | | 4/1990 | Bechtel et al. |
| 4,936,671 A | | 6/1990 | Kaspar |
| 4,940,322 A | | 7/1990 | Hamamoto et al. |
| 5,019,759 A | * | 5/1991 | Takemura et al. ......... 307/10.1 |
| 5,193,029 A | | 3/1993 | Schofield et al. |
| 5,196,965 A | | 3/1993 | Lang et al. |
| 5,424,898 A | | 6/1995 | Larson et al. |
| 5,479,155 A | | 12/1995 | Zeinstra et al. |
| 5,576,687 A | | 11/1996 | Blank et al. |
| 5,659,423 A | | 8/1997 | Schierbeek et al. ......... 359/604 |
| 5,669,698 A | | 9/1997 | Veldman et al. ........... 362/83.1 |
| 5,669,705 A | * | 9/1997 | Pastrick et al. ............. 362/494 |
| 5,684,646 A | * | 11/1997 | Boddy ........................ 359/841 |
| 5,694,259 A | | 12/1997 | Brandin |
| 5,706,144 A | | 1/1998 | Brandin |
| 5,796,176 A | | 8/1998 | Kramer et al. |
| 5,798,575 A | | 8/1998 | O'Farrell et al. |
| 5,808,374 A | | 9/1998 | Miller et al. |
| 5,812,321 A | | 9/1998 | Schierbeek et al. ......... 359/601 |
| 5,859,593 A | | 1/1999 | Takemura et al. |
| 5,883,605 A | | 3/1999 | Knapp ............................ 345/7 |
| 5,938,321 A | | 8/1999 | Bos et al. .................... 362/494 |
| 5,939,796 A | | 8/1999 | Tomassi et al. |
| 5,955,854 A | | 9/1999 | Zhang et al. |
| 5,959,367 A | | 9/1999 | O'Farrell et al. |
| 5,971,552 A | | 10/1999 | O'Farrell et al. ............ 359/871 |
| 6,056,410 A | | 5/2000 | Hoekstra et al. ............ 359/603 |
| 6,093,976 A | | 7/2000 | Kramer et al. |
| 6,099,131 A | | 8/2000 | Fletcher et al. ............. 359/604 |
| 6,163,083 A | | 12/2000 | Kramer et al. ............. 307/10.1 |
| 6,175,164 B1 | | 1/2001 | O'Farrell et al. |
| 6,281,632 B1 | | 8/2001 | Stam et al. |
| 6,291,905 B1 | | 9/2001 | Drummond et al. |
| 6,299,316 B1 | | 10/2001 | Fletcher et al. |
| 6,340,849 B1 | | 1/2002 | Kramer et al. ............. 307/10.1 |
| 6,340,850 B2 | | 1/2002 | O'Farrell et al. |
| 6,465,904 B2 | | 10/2002 | O'Farrell et al. ............ 307/9.1 |
| 6,472,773 B2 | | 10/2002 | Kramer et al. ............. 307/10.1 |

OTHER PUBLICATIONS

Search Report from commonly owned European Application No. EP 98 65 0018, dated Jun. 15, 1998.

British Search Report from commonly owned European Application No. 9714581.7.

Industry Standard SAE J1708 Oct. 1993 entitled "Serial Data Communications Between Microcomputer Systems in Heavy–Duty Vehicle Applications."

Article entitled "Electronics Create the Cybercar," *Design News*, Oct. 9, 1995.

International Search Report for International Application No. PCT/IE97/00019.

* cited by examiner

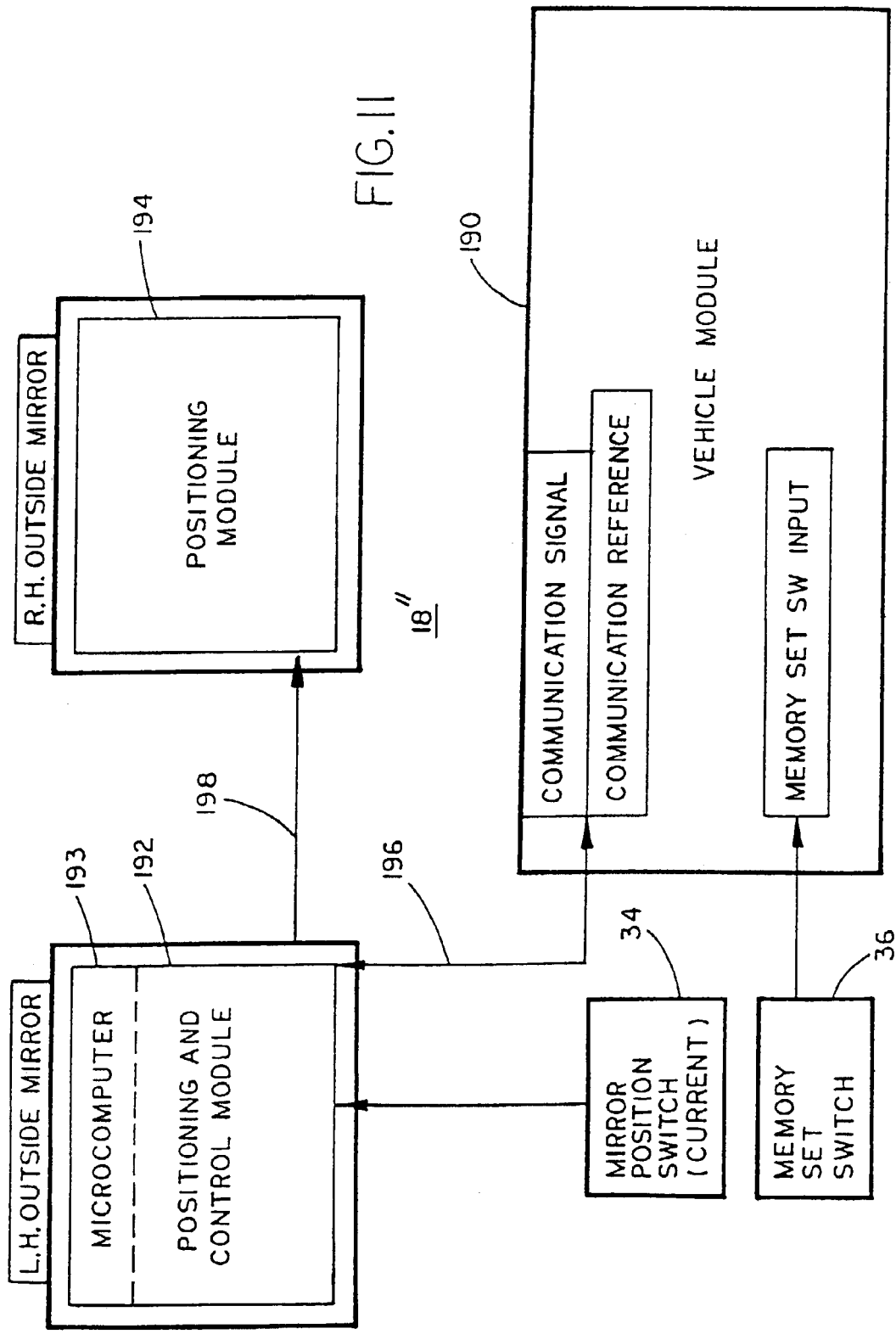

MEMORY MIRROR SYSTEM FOR VEHICLES

CROSS REFERENCE TO RELATED APPLICATIONS

This application is a continuation of application Ser. No. 10/052,181, filed Jan. 17, 2002, now U.S. Pat. No. 6,472,773, which is a continuation of application Ser. No. 09/737,911, filed Dec. 15, 2000, now U.S. Pat. No. 6,340,849, which is a continuation of application Ser. No. 09/448,690, filed Nov. 24, 1999, now Pat. No. 6,163,083, which is a continuation of application Ser. No. 09/135,375, filed Aug. 17, 1998, now U.S. Pat. No. 6,093,976, which is a continuation of application Ser. No. 08/818,918, filed Mar. 17, 1997, now U.S. Pat. No. 5,796,176, which is a continuation-in-part of application Ser. No. 08/679,681 filed Jul. 11, 1996, now U.S. Pat. No. 5,798,575.

BACKGROUND OF THE INVENTION

This invention relates generally to vehicle rearview mirror systems and, more particularly, to vehicle memory mirror systems.

Vehicle memory mirror systems include at least one, and preferably two, electrically operated motors, each of which positions the reflective element with respect to a given axis. By positioning the reflective element about two generally perpendicular axes, the plane of the mirror can be fully positioned. A user-operable switch, such as a joystick or switch pod, is useful to automatically position the mirrors. In a memory mirror system, a monitor device, such as a potentiometer which is coupled to the reflective element, produces a signal indicative of the position of the reflective element with respect to each axis of movement. The signal produced by the monitor device is used in a closed-loop control to allow a controller to reliably position the mirror to particular positions. In this manner, positions of the mirror for different drivers can be stored in memory and retrieved in order to set the mirrors for that driver.

It is generally known in vehicle control systems to provide communication between a vehicle control module and one or more peripheral devices by various communication techniques including digital communications, pulse-width modulation, or other analog communications. It is also generally known to apply such communication techniques between a vehicle control module and control modules in each of the exterior mirror assemblies of the vehicle.

A vehicle typically includes at least two mirrors mounted external of the vehicle, both of which are controlled in the same fashion. In order to avoid duplication of hardware, it is common to provide one user-operable input device in order to control both mirrors. That device typically includes manual buttons for manually positioning the mirror, a selector switch to select one of a driver side or a passenger side mirror, and memory set and recall buttons for operating the memory features of the mirror. The user-operable input device is typically associated with a control device in order to multiplex the switches making up the user-operable device and to communicate with each of tie reflective elements. In order to reduce the number of wires between the control device and each of the mirrors, various techniques have been proposed to multiplex the signals. One such technique is to provide a bidirectional digital communication link between each of the outside mirrors and a central vehicle-based control. The central vehicle-based control receives switch inputs from the user-operable device. The central control provides digitally encoded commands to each of the mirrors. A control in each of the mirrors includes a memory element in order to store particular mirror settings entered by one or more vehicle operators, a data processor, and a position sensor for the reflective element. The data processor compares feedback signals from the position sensor in order to position the reflective element to a position stored in the memory element. In this manner, the central vehicle-based control is greatly simplified and does not need to include a memory function. The only requirement of the control vehicle-based control is that it is capable of encoding data signals.

As disclosed in commonly assigned U.S. Pat. No. 5,798,575 issued to Desmond J. O'Farrell, Roger L. Veldman and Kenneth Schofield for a VEHICLE MIRROR DIGITAL NETWORK AND DYNAMICALLY INTERACTIVE MIRROR SYSTEM, the disclosure of which is hereby incorporated herein by reference, vehicles are increasingly being equipped with serial data communication networks. Such networks include a bidirectional serial multiplex communication link over a bus among a plurality of control modules, each containing a microprocessor or microcomputer. While such serial data communication network could be utilized to provide a communication link between the central processor in each of the mirror assemblies, the protocol of the system provides that higher priority messages are communicated without delay while lower priority messages await communication of higher priority messages. Because mirror-positioning messages would be considered lower priority messages, the serial data communication network may often introduce delays in positioning of the reflective elements. Furthermore, the serial data communication networks are relatively complicated with strict protocol definitions and rigorous hardware requirements.

It would be desirable to provide a vehicle memory mirror system which would incorporate the data processing functions, such as memory storage of multiple mirror positions and the like, in a central control remote from at least one of the mirror assemblies while utilizing a low-wire-count interface between the central control and the mirror assembly.

It would be desirable to provide two or more speeds of operation of a mirror-positioning system. When the user is manually positioning the mirror, it is desirable to move the mirror at a relatively slow rate in order to avoid overshoot of the desired setting under the control of the operator. However, when the mirror is being repositioned to a fixed setting by the processor, it is desirable for the mirror to move at a faster rate. This is particularly desirable because memory mirrors also include a downward tilt setting which is a permanent setting invoked whenever the vehicle is placed in reverse gear. This rotates the mirrors downwardly in order to provide a back-up aid to the driver who is typically interested in the area around the vehicle, rather than in the distance behind the vehicle, when making difficult parking maneuvers and the like. In order to be useful, it is desirable that the mirrors switch to the downward tilt position immediately upon the vehicle being placed in reverse gear in order to provide immediate assistance to the operator.

SUMMARY OF THE INVENTION

According to an aspect of the invention, a vehicle memory mirror system includes a vehicle mirror assembly and a control module. The vehicle mirror assembly includes a reflective element, a motor for positioning the reflective element about an axis, a monitor for monitoring the position of the reflective element with respect to the axis, and a mirror-based control operatively connected with the motor and the monitor in order to position the reflective element at a particular position with respect to the axis. The control module is interconnected with the mirror-based control by an analog interface. The control module includes a processor for providing analog signals on the analog interface indicative of a desired position of the reflective element with respect to the axis. The mirror-based control includes a positioning controller circuit which compares analog signals on the analog interface with a signal produced by the monitor in order to generate signals to operate the motor and thereby position the reflective element at the desired position. The vehicle mirror assembly includes at least one accessory. The mirror-based control either decodes analog signals on the analog interface or encodes analog signals on the analog interface, or both, in order to selectively operate the at least one accessory. Examples of such mirror-based accessories include a turn signal light, a stop signal light, a heater, a security light, a garage door opener, a power-fold mechanism, and the like.

Preferably, the positioning controller is a servo-controller circuit. The use of a servo-controller circuit provides a reliable analog circuit which is capable of responding to the analog signals formatted on the analog interface in order to reliably position the reflective element at its desired final position. Advantageously, the servo-controller circuit can be implemented in an application-specific-integrated-circuit for low-cost, high-volume production. Alternatively, other forms of positioning controllers may be used.

According to another aspect of the invention, a vehicle memory mirror system includes a vehicle mirror assembly and a control module. The vehicle mirror assembly includes a reflective element, a motor for positioning the reflective element upon an axis, a monitor for monitoring the position of the reflective element with respect to the axis, and a mirror-based control operatively connected with the motor and the monitor in order to position the reflective element at a particular position with respect to the axis. The control module is interconnected with the mirror-based control by an interface. The control module includes a processor for providing analog signals on the interface indicative of a desired position of the reflective element with respect to the axis. The processor controls the speed at which the reflective element moves toward a terminal position by formatting signals which each represent an incremental movement of the reflective element with respect to the axis. In this manner, should the processor wish to move the reflective element to a final position at a high rate of speed, the processor formats signals representing the final position of the reflective element or large incremental movement signals. The vehicle-based control will then respond by moving the reflective element at a speed limited only by the hardware of the vehicle mirror assembly. If, however, the control module intends to move the reflective element at a slower speed, the processor formats a series of analog signals, each of which represents smaller incremental movement of the reflective element. In this manner, the frequency with which the incremental move commands are issued and the amount of movement represented by each command allows the control module to regulate the speed of movement of the reflective element. In this manner, the reflective element can be moved to its final position at a high rate of speed, for example, when it is being positioned from a retrieved memory setting. The control module can move the reflective element at a slower rate of speed, for example, in response to commands manually entered by the driver, in order to avoid overshoot.

According to yet another aspect of the invention, a vehicle memory mirror system includes first and second vehicle mirror assemblies. Each assembly includes a reflective element, a motor for positioning the reflective element about an axis, a monitor for monitoring the position of the reflective element with respect to the axis and a mirror-based control operatively connected with the motor and the monitor in order to position the reflective element at a particular position with respect to the axis. One of the mirror-based controls includes a computer and memory for storing preselected positions of the reflective elements of both of the mirror assemblies. The other mirror-based control is interconnected with the one mirror-based control by an interface. The other mirror-based control responds to signals output to the interface by the one mirror-based control indicative of a desired position of the reflective element associated with the other mirror-based control and a signal produced by the associated monitor. The other mirror-based control operates the associated motor in order to position the associated reflective element to the desired position. This configuration provides a vehicle mirror network which is exceptionally effective and economical.

These and other objects, advantages, and features of this invention will become apparent upon review of the following specification in conjunction with the drawings.

BRIEF DESCRIPTION OF THE DRAWINGS

FIG. 11 is the same view as FIG. 2 of another alternative embodiment.

DESCRIPTION OF THE PREFERRED EMBODIMENT

Figure 1:
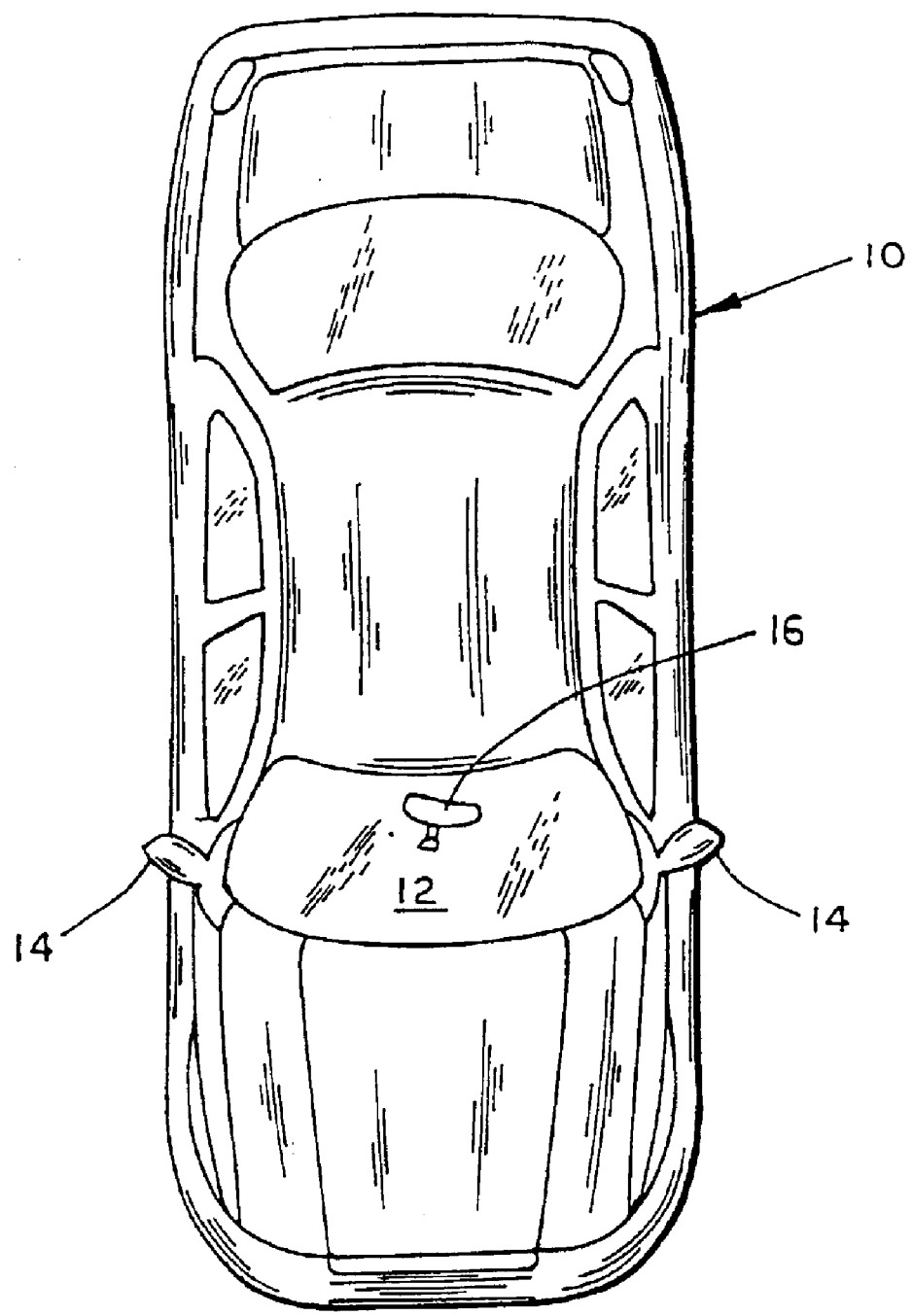
FIG. 1 is a top plan view of a vehicle incorporating a memory mirror system according to the invention.
Figure 2:
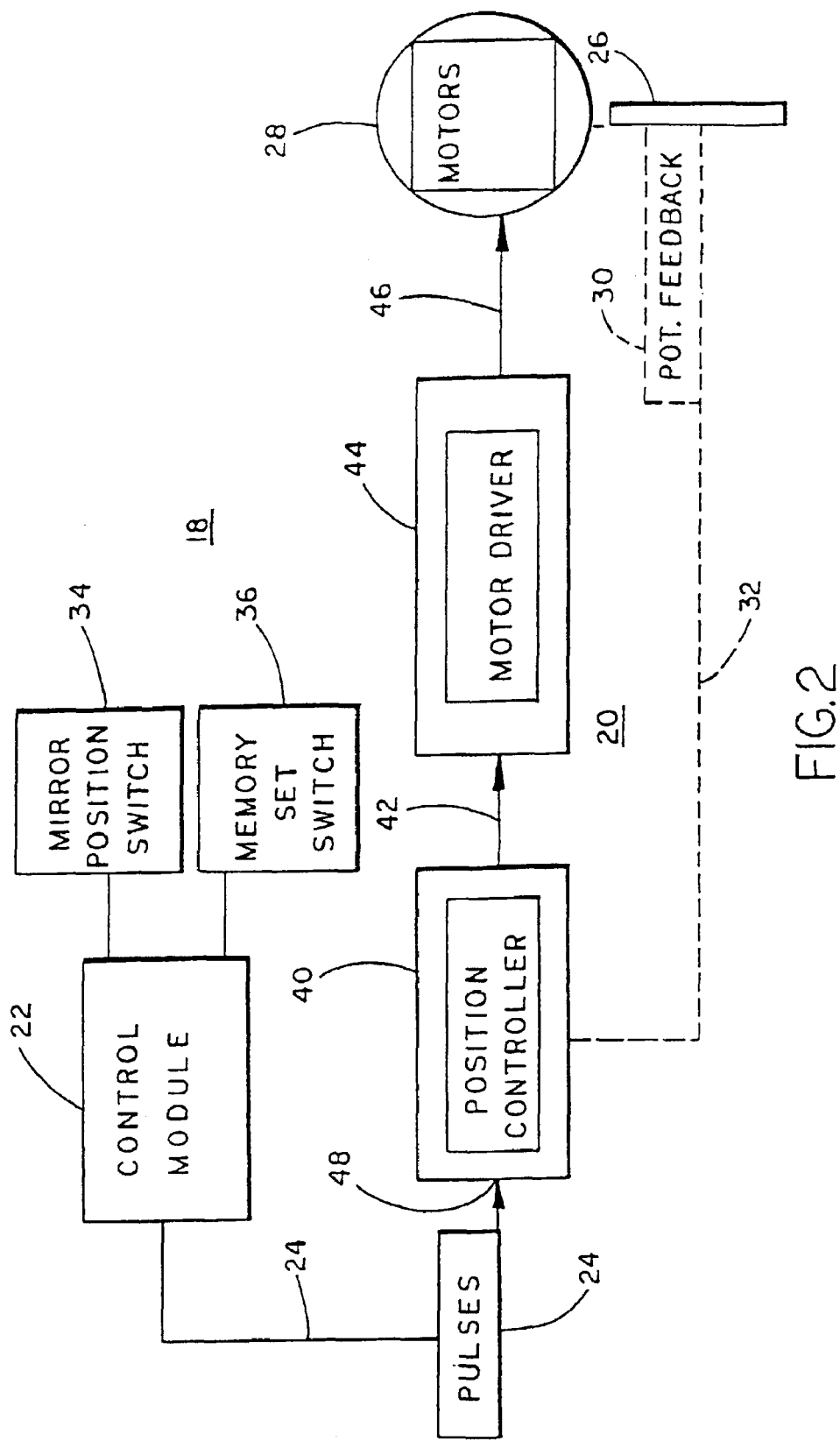
FIG. 2 is a block diagram of a memory mirror system according to the invention.

Referring now specifically to the drawings, and the illustrative embodiments depicted therein, a vehicle 10 is illustrated as being equipped with a vehicle memory mirror system 12 including at least one exterior mirror 14 and an interior rearview mirror 16 (FIG. 1). Memory mirror system 12 includes an electronic control system 18 made up of a mirror-based control module 20 in each exterior rearview mirror 14 and a control module 22 which is interconnected with each mirror-based control module 20 by an analog interface 24 (FIGS. 2–6). Mirror-based control module 20 may be positioned within the mirror housing, or head, of the associated mirror, or may be positioned in the mirror support base. Control module 22 may be located in the vehicle door under the dash, or the like. Control module 22 may be associated with other vehicle control functions such as seat position control, or the like.

Control module 22 includes a processor 23 which produces analog signals on each analog interface 24 indicative of a desired position of a reflective element 26 in respect to an axis of rotation. The desired position may be a final position or an intermediate position for the reflective element. However, control module 22 puts out an analog signal on analog interface 24 for each desired movement of the reflective element. As is conventional, reflective element 26 is positioned about an axis by a motor 28. A monitoring device, such as a potentiometer 30, is mechanically coupled to reflective element 26 and produces an output signal at 32 indicative of the position of the reflective element 26 about the axis of rotation. As is also conventional, reflective element 26 is positioned about two generally perpendicular axes by a pair of motors 28. A pair of potentiometers 30 monitor the position of reflective element 26 about the two axes of rotation.

In the illustrated embodiment, control module 22 encodes pulse-coded signals on each analog interface 24 indicative of the desired position of the reflective element. The reflective element could be an electro-optic device, such as an electrochromic mirror, or could be a conventional reflective element, such as a chrome reflective element. The pulse-coded signals have a selectable pulse width, each pulse width representative of a particular position of the reflective element. Because there are two motors 28 for each mirror assembly, control module 22 typically encodes two series of pulses on analog interface 24, one series of pulses for each of the motors. The two pulse streams may be time-multiplexed on a single-channel analog interface or may be provided in parallel on a dual-channel analog interface. Other analog encoding techniques are possible. For example, a desired position of the reflective element can be encoded by selecting a particular DC voltage amplitude. The amplitude can be of one polarity or could alternate polarities to indicate different positional ranges. Likewise, the DC analog voltage could be supplied to the two motors over a two-channel analog interface 24 or time division-multiplexed on a single-channel analog interface.

Control module 22 receives a first set of input signals from a mirror position switch assembly 34 and a second set of inputs from a memory set switch assembly 36. Processor 23 responds to movement of mirror position switch 34 by encoding analog signals on analog interface 24 representative of inputs entered by the user in the mirror position switch. In order to reduce the number of wire interconnections and other hardware, mirror position switch 34 is used to selectively position both exterior mirrors 14 with a toggle switch used to designate which of the mirrors is being positioned. Mirror position switch 34 may be a joystick, a switch pod, or similar known input device. Memory set switch 36 is operable by the user in order to set memory positions for two or more vehicle drivers and retrieve memory positions for two or more drivers. When the operator uses memory set switch assembly 36 to store a mirror position, processor 23 stores, in a memory 25, positions of motors 28 corresponding to the last commands issued on analog interface 24. The assumption is that the mirror-based control module 20 operated the motors 28 to the commanded position. When the user retrieves one of the memory settings using memory set switch assembly 36, processor 23 retrieves the positional settings from memory 25 and encodes analog signals oil analog interface 24 in order to operate motors 28 to position the reflective element 26 to the retrieved setting. In addition to driver retrievable positions, memory 25 may contain an additional setting in which each reflective element 26 is rotated about a horizontal direction to a predetermined position such as a fully downward tilt position. When the vehicle is placed in reverse gear, processor 23 retrieves the downward tilt position and encodes the position on analog interface 24 in order to drive the mirror reflective elements to a downward tilt position. This position aids the driver in reversing the vehicle. In addition, processor 23 may respond to other inputs, such as one received from a keyless entry system in order to retrieve a mirror setting from memory 25 corresponding to the driver using that particular keyless entry transmitter. This avoids the necessity of each driver needing to manipulate memory set switch assembly 36 when that driver uses vehicle 10.

Position controller 40 receives inputs from analog interface 24 and produces outputs 42 which are supplied to a motor driver 44. Motor driver 44 buffers the signals received from outputs 42 and supplies sufficient electrical energy oil its outputs 46 in order to rotate motors 28. Preferably, position controller 40 includes a servo-controller circuit 60 which compares analog signals on analog interface 24, if more than one series of pulses are multiplexed on interface 24, with signals produced by potentiometer 30 in order to operate motors 28 to position the reflective element at a desired position. Servo-controller circuit 60 may include a pulse decoder 62 in order to decode pulses received on analog interface 24, if more than one series of pulses are multiplexed on interface 24, and servo amplifier circuit 66 which drives the motor to a position selected by control module 22. If a two-channel analog interface 24 is used, pulse decoder 62 may be eliminated. Servo-amplifier circuit 66 is made up of a pulse comparator 68 which receives a first input from analog interface 24 and a second input 32' from potentiometer 30. Input 32' is provided to a mono-stable multi-vibrator 70 to convert the voltage level on input 32' to a pulse supplied to pulse comparator 68. Pulse comparator 68 compares the width of the two input pulses and sets a directional flip-flop 72 to an appropriate output state dependent upon the relative widths of the pulses. Pulse comparator 63 also produces on an output 73 an error pulse having a width equal to the difference in widths of the pulses supplied to its inputs. The outputs of flip-flop 72 are gated by a Schmitt trigger 74 and supplied as an input to motor driver 44'. The duration of the gate is a function of the width of the error pulse which is produced by pulse comparator 68 on output 73 and processed by pulse stretcher 76. In this manner, servo-amplifier circuit 66 operates motor 28 until the feedback received from monitor 30 is equal to the position selected oil analog input 24. In the embodiment illustrated in FIGS. 5 and 6, servo-amplifier circuit 66 is made up of a pair of commercially available circuits 78 marketed by Ideal Semiconductor under Model No. NE544.

Figure 3:
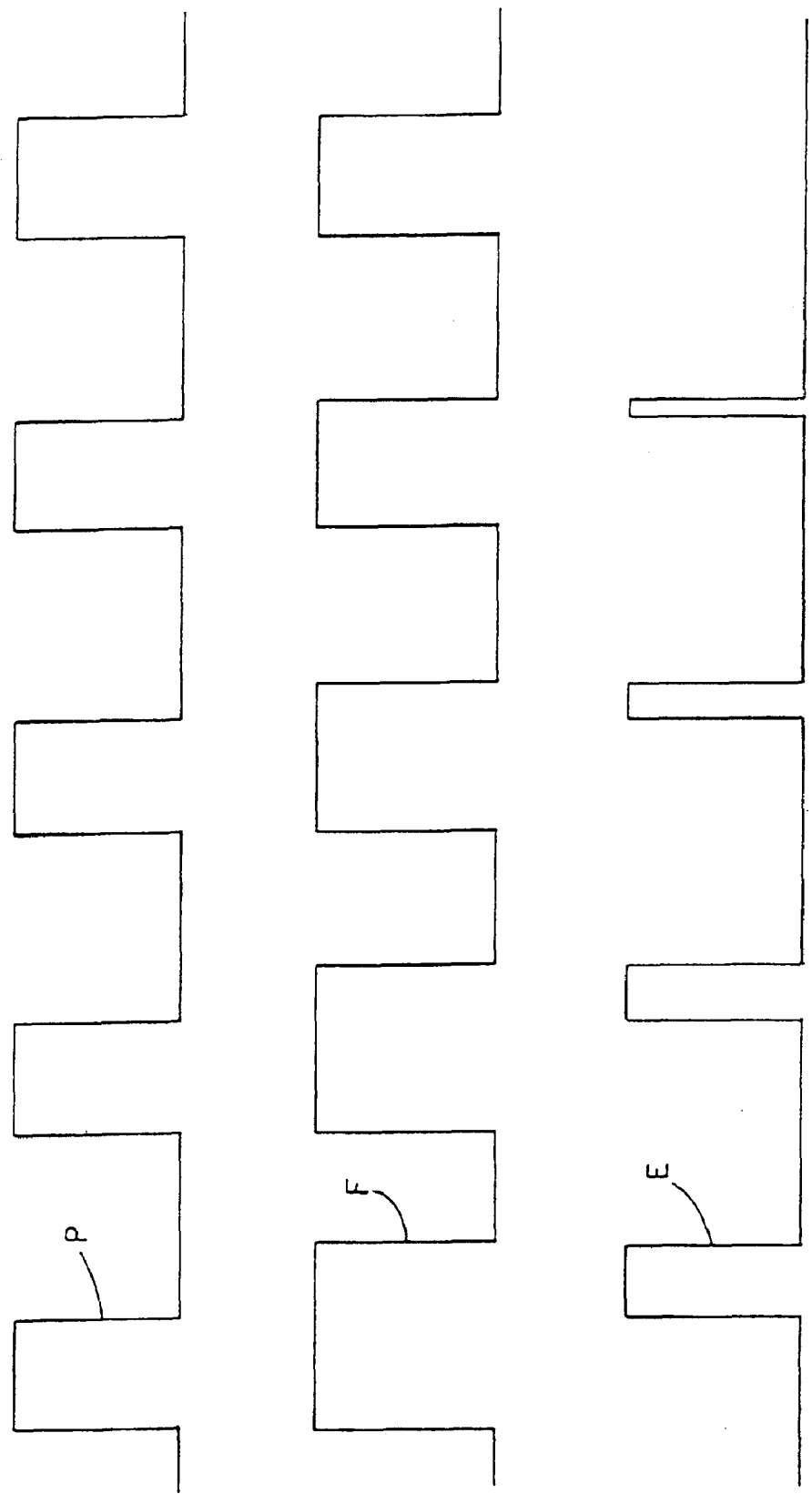
FIG. 3 is a diagram illustrating signals used in positioning a mirror element according to the invention.
Figure 4:
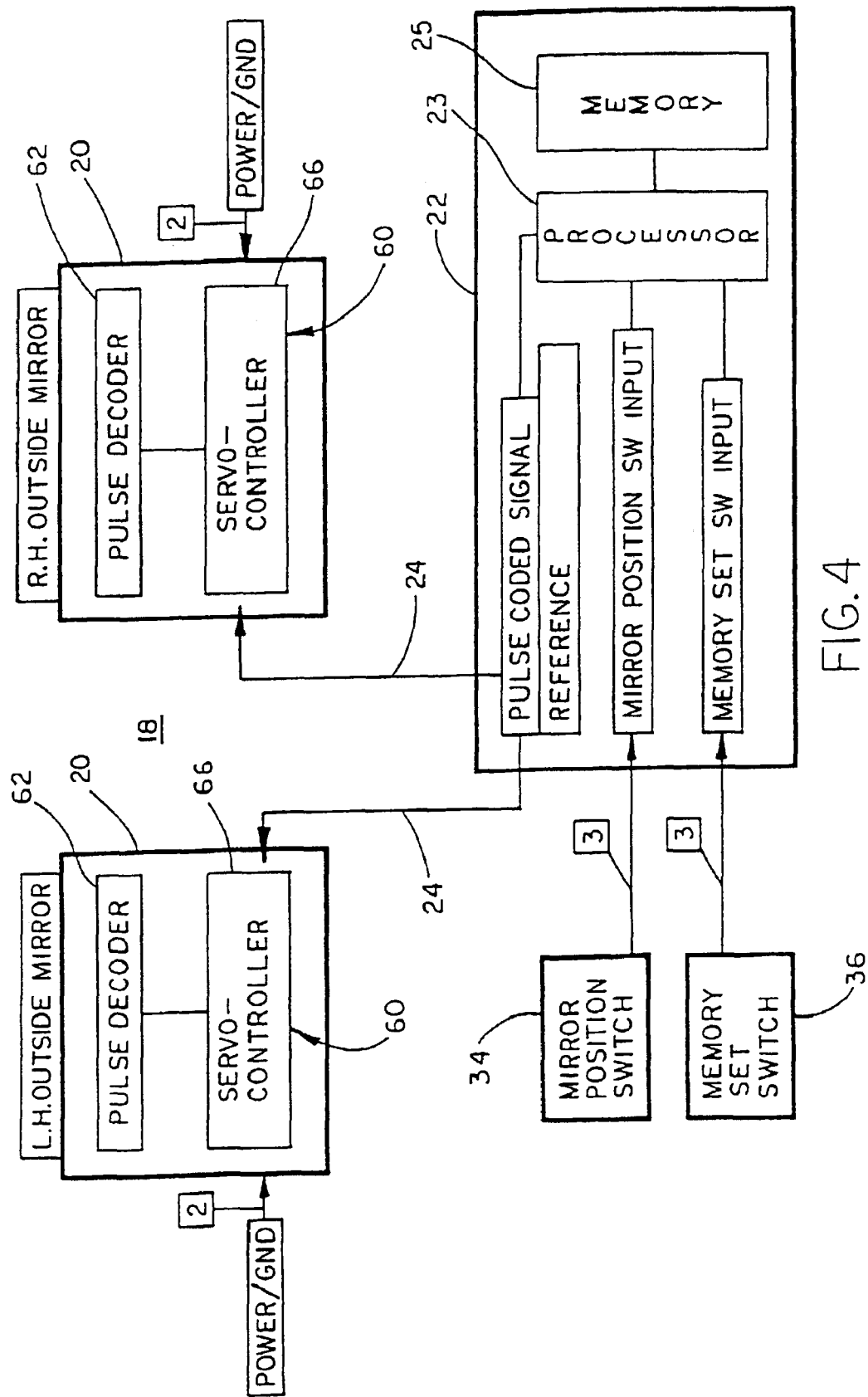
FIG. 4 is a more detailed block diagram of the mirror-based control in FIG. 2.
Figure 5:
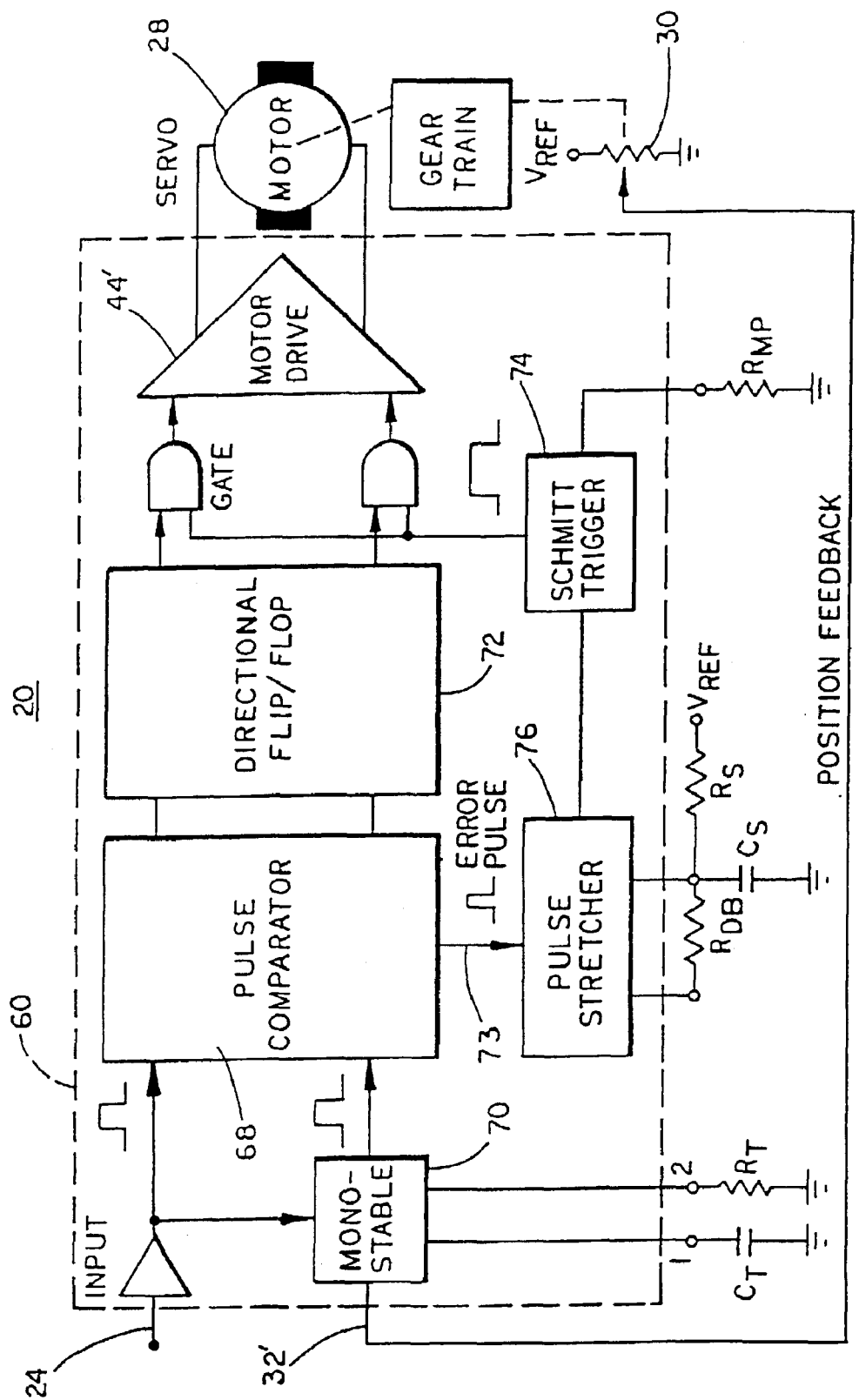
FIG. 5 is a block diagram of the mirror-based control in FIG. 4.
Figure 6:
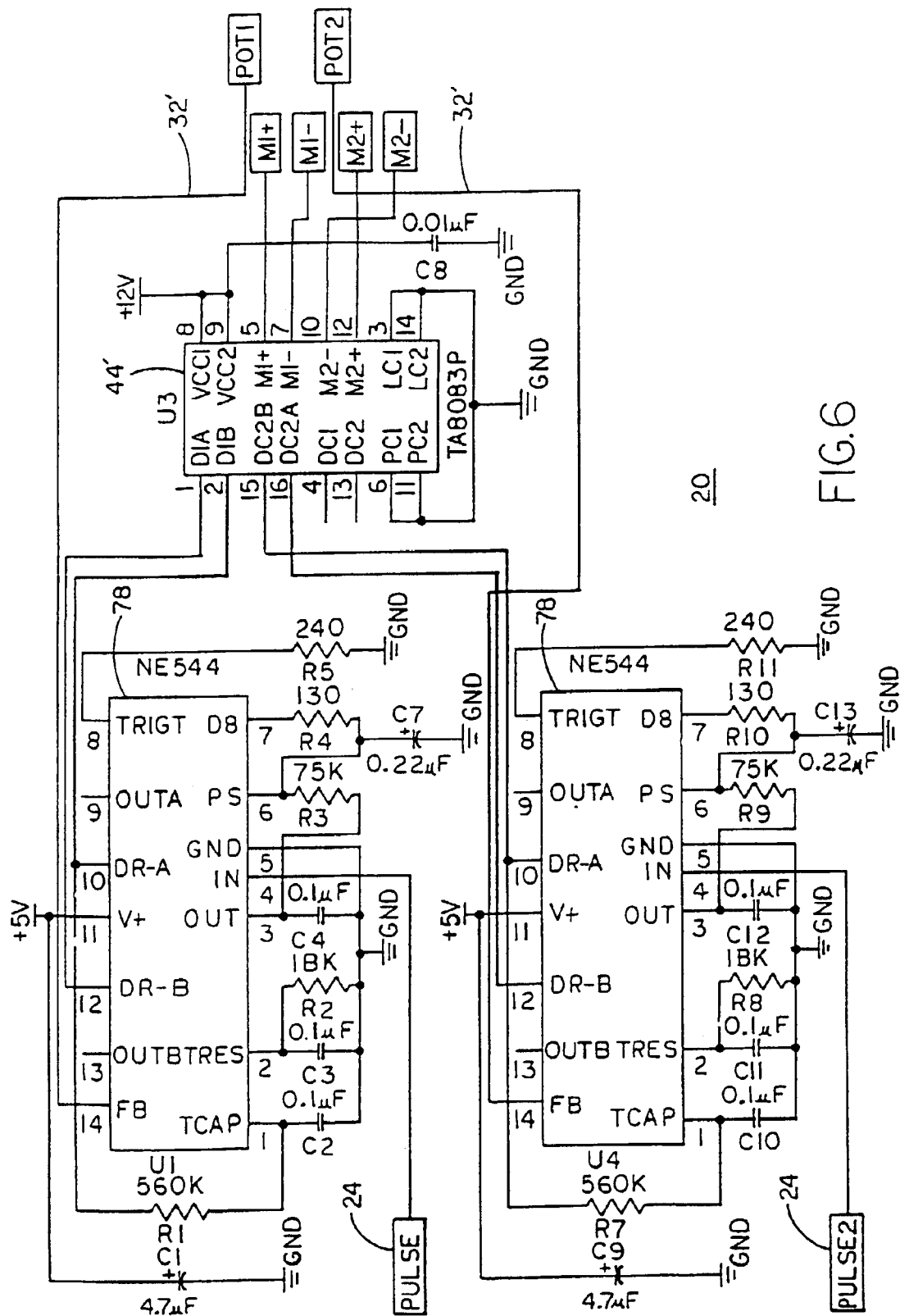
FIG. 6 is an electrical schematic diagram of the mirror-based control in FIG. 5.

With reference to FIG. 3, control module 22 produces a series of pulses P on an analog interface, each having a width representative of a desired position of reflective element 26 about one axis. Multivibrator 70 produces a series of pulses F, each of which has a width that is proportional to the voltage level developed by potentiometer 30. Hence, the width of pulses F is an indication of the position of reflective element 26. A series of error pulses E are produced at output 73 of a pulse comparator. The width of pulses E and the relative widths of pulses P and F determine the duration and polarity of the energizing power supplied to motor 28 by motor driver 44. It can be seen in FIG. 3 that, as the motor is actuated in response to error pulses E, the width of pulses F approaches the width of pulses P and the width of error pulses E diminishes to substantially zero. Control module 22 produces pulses for a period of time designed to represent the time it would take the reflective element to travel from one extent to the other. In the illustrated embodiment, that period of time is approximately five (5) seconds.

Figure 8:
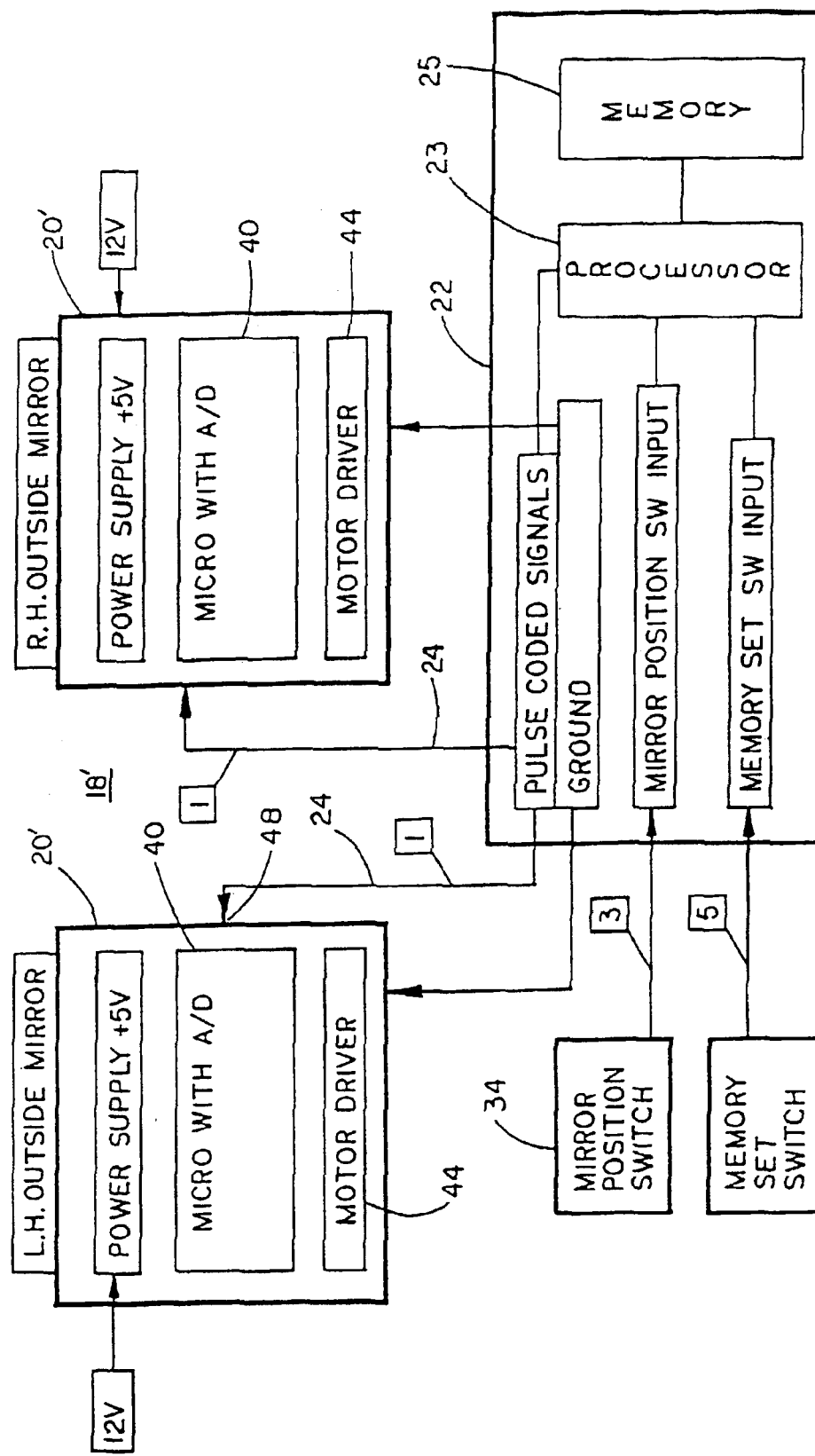
FIG. 8 is the same view as FIG. 2 of an alternative embodiment.
Figure 9:
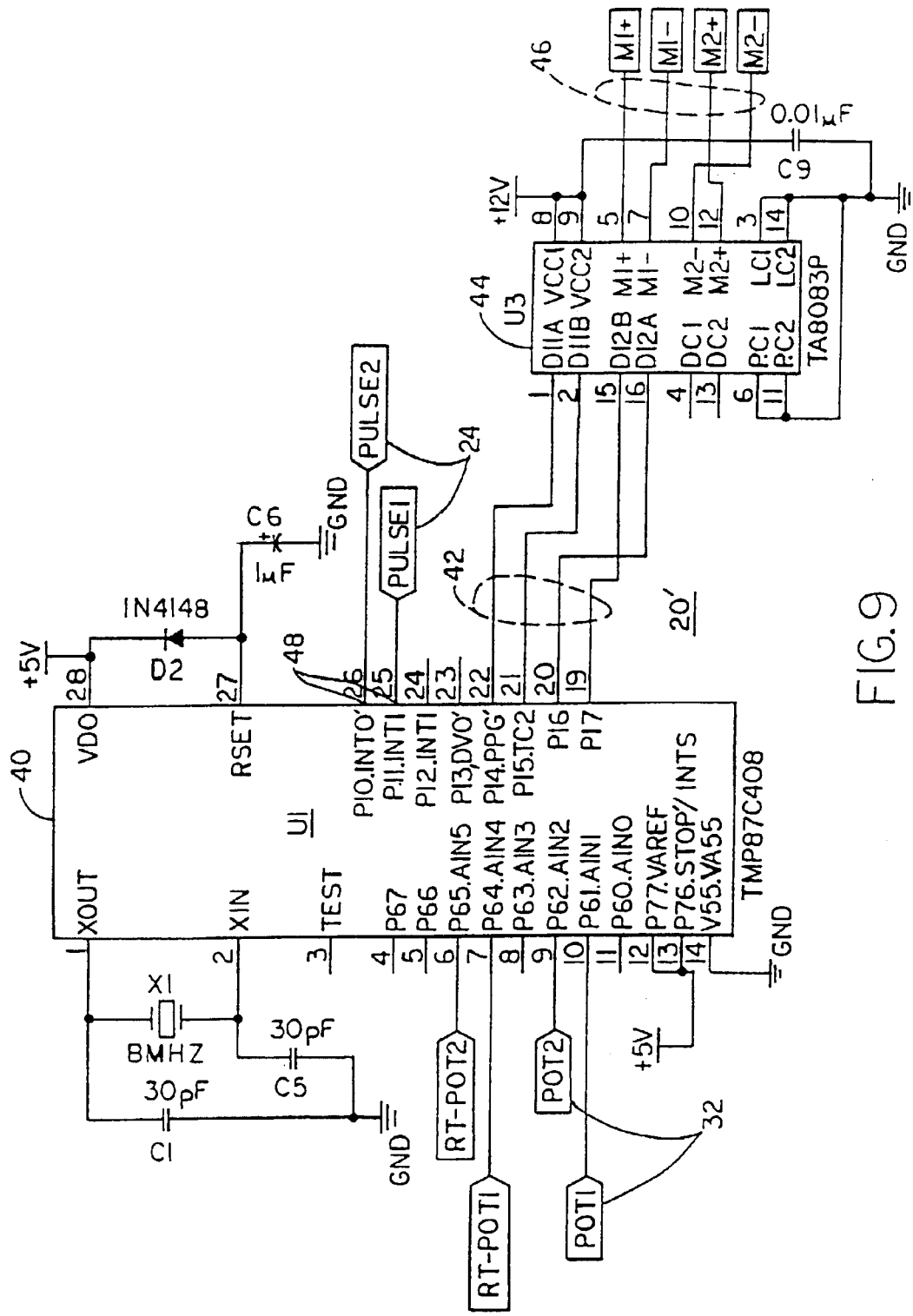
FIG. 9 is an electrical schematic diagram of the mirror-based control in FIG. 8.
Figure 10:
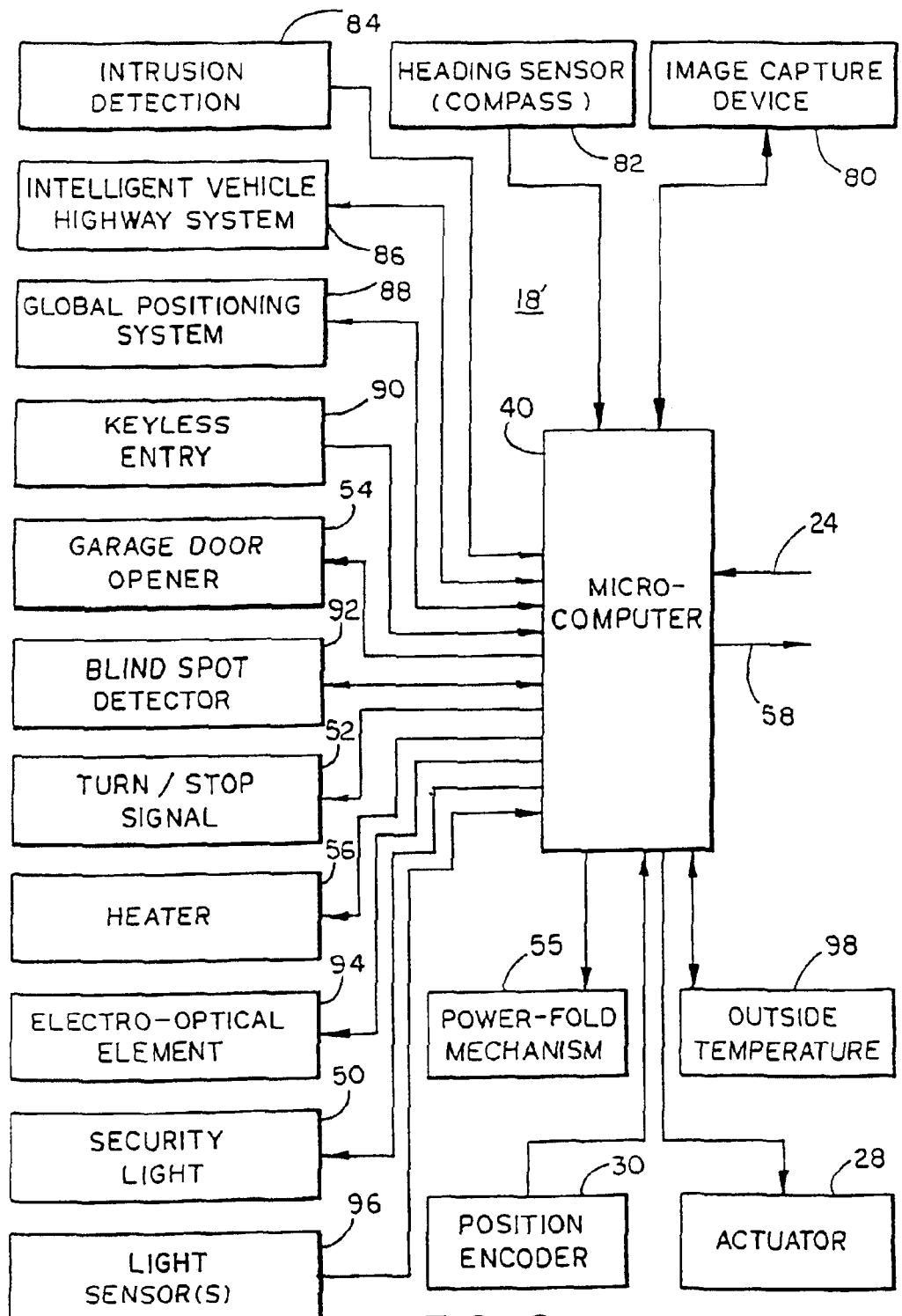
FIG. 10 is a block diagram of the mirror-based control in FIG. 9.

In an alternative embodiment, an electronic control system 18' includes a control module 22, which may be the same control module utilized with electronic control system 18, and a mirror-based control module 20' (FIGS. 8–10). Each mirror-based control module 20' includes a microprocessor 40 which receives inputs from analog interface 24 and produces outputs 42 which are supplied to a motor driver 44. Motor driver 44 buffers the signals received from microprocessor outputs 42 and supplies sufficient electrical energy on its outputs 46 in order to rotate motors 28. Analog interface 24 is supplied to an interrupt timer input 48. This advantageously provides microprocessor 40 with the ability to measure the width of each pulse on analog interface 24 in order to decode the corresponding desired mirror position. Additionally, as an interrupt, input 48 allows microprocessor 40 to "go to sleep" in a very low energy consumption mode when commands are not being received on analog interface 24. However, when a command is encoded by control module 22, the signal interrupts microprocessor 40 and places the microprocessor in an active mode. In this manner, electronic control system 18' can be responsive even when the vehicle is in an OFF-ignition state without a large constant drain on the electrical system. This allows the driver to position the mirrors prior to starting the vehicle.

In the illustrated embodiment, microprocessor 40 is commercially available and marketed by Toshiba under Model No. TMP87C408. Microprocessor 40 receives analog signals on two lines designated PULSE ONE and PULSE TWO and receives two potentiometer output signals designated POT ONE and POT TWO. Outputs 42 of motor driver 44 are supplied as positive and negative inputs designated M1+, M1−, M2+ and M2− to the two motors 28. By controlling the amplitude and polarity of the signals applied to the outputs 46 of motor driver 44, microprocessor 40 is able to drive each motor 28 in both directions.

In addition to performing the memory minor functions of memory minor system 12, electronic control system 18' is capable of operating various accessories which may be provided with exterior minor 14 (FIG. 10). For example, as is disclosed in U.S. Pat. No. 5,798,575 issued to Desmond J. O'Farrell, Roger L. Veldman and Kenneth Schofield for a VEHICLE MIRROR DIGITAL NETWORK AND DYNAMICALLY INTERACTIVE MIRROR SYSTEM, the disclosure of which is hereby incorporated herein by reference, such accessory devices may include a turn or stop signal 52, a heater 56, a security light 50, a garage door opener 54 or a power-fold mechanism 55. Control module 22 can selectively operate any of such accessories by encoding an analog signal which does not fall within the range of analog signals corresponding to desired positions of reflective element 26. In this manner, microprocessor 40 is capable of decoding such analog signal, determining the device to be controlled and either activating or deactivating the device as appropriate. In addition to operating accessories, such as security light 50, mm/stop signal 52, garage door opener 54, and heater 56, under the command of control module 22, electronic control system 18' may additionally receive inputs from various input devices illustrated in FIG. 5, such as an image-capture device 80, a heading sensor or compass 82, an intrusion detection circuit 84, an intelligent vehicle highway system (IVHS) transceiver 86, a global positioning system (GPS) receiver 88, a keyless entry receiver 90, a blind spot detector 92, an electro-optical element 94, one or more light sensors 96, an outside temperature sensor 98, and the like. Microcomputer 40 may then encode analog signals on a second analog interface 58 and supply such signals to control module 22 using the techniques described herein.

Figure 7:
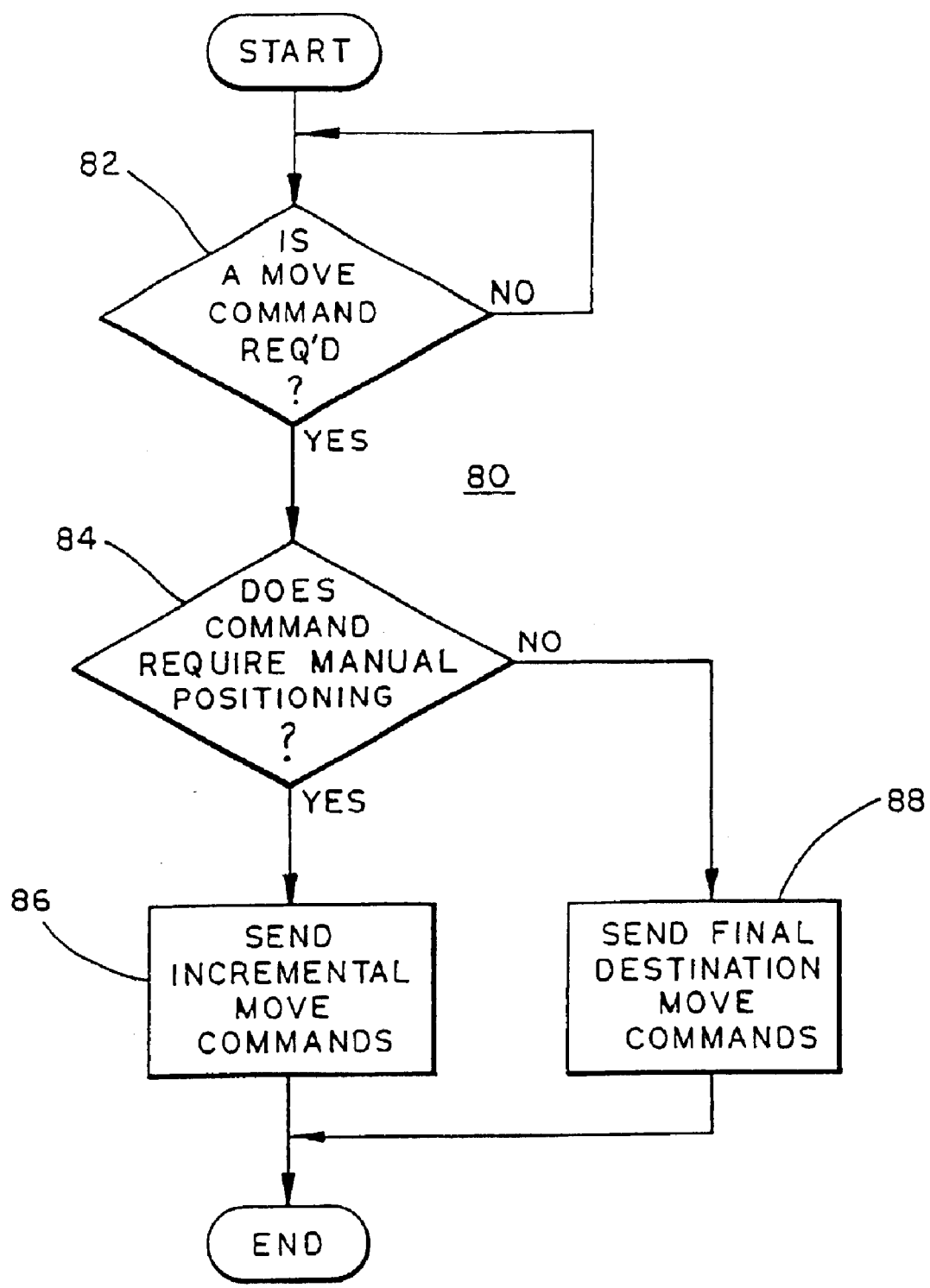
FIG. 7 is a flowchart of a reflective element-positioning routine.

Electronic control systems 18, 18' are capable of controlling the speed of operation of each servo motor 28 utilizing a speed control routine 80 (FIG. 7). When it is determined at 82 that control module 22 must send a move command to move motor 28, it is determined at 84 whether the move command is one resulting from manual positioning by the operator. If so, then processor 23 produces a series of move commands, each representing an incremental movement of the reflective element that is less than the final destination desired. These move commands are generated and formatted on an interface, such as analog interface 24, at a rate that provides controlled movement of the reflective element, namely at a rate that is less than the rate motor 28 is capable of moving the reflective element. This is a function of the amount of movement produced by each incremental move command as well as the frequency with which the width of the move commands is modified, as would be understood by those skilled in the art. If it is determined at 84 that the move command does not result from manual positioning by the user, then processor 23 formats a series of move commands at 88 which represents the final destination of the reflective element. Thereby, the highest operational speed of motor 28 determine the speed at which the reflective element is moved to its final destination. In this manner, when the move command is initiated as a result of retrieving a final destination from memory, the reflective element is moved at a faster rate, whereas if the move command is a result of manual operation by the operator, the reflective element is moved at a slower rate in order to avoid overshoot. Alternatively, rather than sending a series of pulses of uniform width equivalent to a final destination to reposition the reflective element at a faster rate, processor 23 may send incremental move commands which, because of their frequency and amount of incremental movement, result in a faster rate of movement than the incremental move commands formatted at 86. This principle can be applied to memory mirror systems having interface between a vehicle module and a mirror-based control that is digital, analog, or direct wired.

In an embodiment illustrated in FIG. 11, an electronic control system 18" includes a vehicle module 190 which receives input from a memory set switch and has an interface 196 with a mirror-based control module 192. Vehicle module 190 is preferably in the vehicle door under the dash, or the like. Mirror-based control module 192 is positioned in one of the exterior mirrors 14. Interface 196 may be an analog or digital interface or direct wired, and is for the primary purpose of passing control signals between modules 190 and 192 including actuation of the memory set switch to either store a particular mirror position or to retrieve one of several stored mirror positions or an indication that the vehicle has been placed in reverse gear. Mirror-based control module 192 receives input directly from mirror position switch 34 indicative of the vehicle operator's desire to manually reposition the reflective element. Mirror-based control module 192 includes a microcomputer 193 which performs the function of positioning the associated reflective element and storing positions of the reflective elements for both mirrors 14, 14. In this manner, the memory function for both reflective elements is carried out by positioning and control module 192.

Positioning and control module 192, positioned in one of the mirror assemblies 14, 14, is interfaced with a mirror-based positioning module positioned in the other of the mirror assemblies 14, 14 by an interface 198. Interface 198 may be an analog or digital interface or hard wired. This configuration allows positioning and control module 192 to store and retrieve positions of the reflective elements associated with both mirror assemblies 14, 14 and control the positioning of both reflective elements, all in response to command inputs from vehicle module 190 and the mirror position switch. This may be accomplished by including a microprocessor only with position and control module 192 or also with positioning module 194. Alternatively, positioning module 194 may include a servo-controller. Positioning module 194 could alternatively be a conventional memory mirror assembly hardwired at 198 to position and control module 192.

Thus, it is seen that the present invention provides a system which is capable of reliable memory mirror positioning in a way which avoids the complexity of known digital bus systems and protocols. However, the benefits of reduced wire count and reliable operation are achieved. Furthermore, a system, according to the invention, is capable of operating additional electrical accessories which may be associated with the exterior mirror. The system is adaptable for use in multiple vehicle lines without the requirements for modification of the protocol for each particular vehicle line.

Although the invention is illustrated for use in positioning exterior mirrors, it has application for any place on a vehicle where it is desired to operate a motor in order to position a device. Other examples include vehicle seat positioning, antenna extension, and the like. This can be accomplished in a reliable manner with requiring only a single electrical conductor to each of the remote devices.

Changes and modifications in the specifically described embodiments can be carried out without departing from the principles of the invention, which is intended to be limited only by the scope of the appended claims, as interpreted according to the principles of patent law including the Doctrine of Equivalents.

The embodiments of the invention in which an exclusive property or privilege is claimed are defined as follows:

1. A vehicle memory mirror system for a vehicle having an ignition system, comprising:

first and second vehicle mirror assemblies, each including a reflective element, a motor for positioning said reflective element about an axis, a monitor for monitoring the position of said reflective element with respect to said axis and a mirror-based control in order to position said reflective element at a particular position with respect to said axis;

said mirror-based control of at least one of said first and second mirror assemblies comprising a microcomputer;

said microcomputer operating said motor in response to an input;

said input comprising an interrupt input, wherein said mirror-based control of said at least one of said first and second mirror assemblies has a reduced energy mode that is terminated in response to said input whereby said microcomputer is responsive to said input even when the ignition system of the vehicle is off.

2. The memory mirror system of claim 1 wherein said mirror-based control of said first mirror assembly and said mirror-based control of said second mirror assembly comprise microcomputers operating the respective said motor in response to an input and wherein said input of each of said microcomputers comprises an interrupt input.

3. The memory mirror system of claim 1 wherein said mirror-based control receives a command at said input from a control located in the vehicle.

4. The memory mirror system of claim 3 wherein said control located in the vehicle receives another input from one of (i) a mirror switch assembly that is user operable to selectively position said reflective element with respect to said axis, (ii) a memory set switch that is operable by the user of the vehicle in order to set memory positions for said reflective element for multiple vehicle drivers and retrieve memory positions for said reflective element for multiple vehicle drivers, and (iii) the vehicle being placed in reverse gear.

5. The memory mirror system of claim 3 wherein said control located in the vehicle is positioned in a vehicle door.

6. The memory mirror system of claim 3 wherein said control located in the vehicle is positioned under a vehicle dash.

7. The memory mirror system of claim 3 wherein said control located in the vehicle is associated with a seat position control.

8. The memory mirror system of claim 4 wherein said mirror-based control operates said motor at a first speed in response to user operation of said mirror switch assembly and at a second speed in response to one of user operation of said memory set switch and the vehicle being placed in reverse gear.

9. The memory mirror system of claim 4 wherein said control located in the vehicle receives a first input from said mirror switch assembly and another input from at least one of said memory set switch and the vehicle being placed in reverse gear.

10. The memory mirror system of claim 8 wherein said second speed is greater than said first speed.

11. The memory mirror system of claim 9 wherein said mirror-based control controls the speed at which the reflective element moves towards a final position at a lower speed in response to said first input than said another input.

12. The memory mirror system of claim 1 wherein each of said first and second mirror assemblies includes a housing for said reflective element and wherein said mirror-based control is positioned in said housing or said mirror assembly.

13. The memory mirror system of claim 1 wherein each of said first and second mirror assemblies includes a housing for said reflective element and a support of said mirror assembly, said mirror-based control is positioned in said support of said mirror assembly.

14. The memory mirror system of claim 1 wherein each of said mirror assemblies includes at least two accessories and wherein said mirror-based control selectively operates said at least two accessories.

15. The memory mirror system of claim 14 wherein each of said mirror assemblies comprising at least two accessories selected from the group consisting of a turn signal, a stop signal, a heater, a security device, a garage door opener, an image-capture device, a heading sensor, an intrusion detection circuit, an intelligent vehicle highway system transceiver, a global-positioning system receiver, a keyless entry receiver, a blind spot detector, an electro-optical element, at least one light sensor, an outside temperature sensor, a power-fold mechanism and said motor.

16. The memory mirror system of claim 15 wherein said at least two accessories are selected from the group consisting of a turn signal, a stop signal, a heater, a security light, a power-fold mechanism, an electro-optical element, an intelligent vehicle highway system transceiver and a garage door opener and said motor.

17. The memory mirror system of claim 16 wherein said at least two accessories comprise at least one of said turn signal and said security light.

18. The memory mirror system of claim 17 wherein said mirror-based control provides an output to operate said at least one of said turn signal and said security light.

19. The memory mirror system of claim 15 wherein said at least two accessories comprise at least one of said stop signal and said turn signal.

20. The memory mirror system of claim 19 wherein said mirror-based control provides an output to operate said at least one of said stop signal and said turn signal.

21. The memory mirror system of claim 15 wherein said at least two accessories comprise at least one of said security light and said stop signal.

22. The memory mirror system of claim 21 wherein said mirror-based control provides an output to operate said at least one of said security light and said stop signal.

23. The memory mirror system of claim 21 wherein said mirror-based control receives an input from a keyless entry receiver system to actuate said security light.

24. The memory mirror system of claim 15 wherein said at least two accessories comprise at least one of said power-fold mechanism and said motor.

25. The memory mirror system of claim 24 wherein said mirror-based control provides an output to operate said at least one of said power-fold mechanism and said motor.

26. The memory mirror system of claim 15 wherein said at least two accessories comprise at least one of said electro-optical element and said heater.

27. The memory mirror system of claim 26 wherein said mirror-based control provides an output to operate said at least one of said electro-optical element and said heater.

28. The memory mirror system of claim 27 wherein said reflective element comprises said electro-optical element a said heater and wherein said mirror-based control provides an output o operate said electro-optical reflective element and said heater.

29. The memory mirror system of claim 28 wherein said electro-optical element comprises an electrochromic mirror.

30. The memory mirror system of claim 1 wherein said first and second mirror assemblies are selected from the group consisting of an interior rearview mirror assembly, a driver-side exterior rearview mirror assembly and a passenger-side exterior rearview mirror assembly.

31. The memory mirror system of claim 30 wherein one of said first and second mirror assemblies comprises said driver exterior rearview mirror assembly and the other of said first and second rearview mirror assemblies comprises said passenger-side exterior rearview mirror assembly.

32. The memory mirror system in claim 30 wherein one of said first and second mirror assemblies comprises said interior rearview mirror assembly and the other of said first and second rearview mirror assemblies comprises said driver-side exterior rearview mirror assembly.

33. The memory mirror system in claim 30 wherein one of said first and second mirror assemblies comprises said interior rearview mirror assembly and the other of said first and second rearview mirror assemblies comprises said passenger-side exterior rearview mirror assembly.

34. The memory mirror system in claim 1 wherein said first rearview mirror assembly comprises an interior rearview mirror assembly and said second rearview mirror assembly comprise one of a driver-side exterior rearview mirror assembly and a passenger-side exterior rearview mirror assembly.

* * * * *

UNITED STATES PATENT AND TRADEMARK OFFICE
CERTIFICATE OF CORRECTION

PATENT NO. : 6,867,510 B2  
DATED : March 15, 2005  
INVENTOR(S) : Mark E. Kramer and Roger L. Veldman Page 1 of 1

It is certified that error appears in the above-identified patent and that said Letters Patent is hereby corrected as shown below:

Column 1,
Line 59, "tie" should be -- the --.

Column 5,
Line 67, "oil" should be -- on --.

Column 6,
Lines 20 and 41, "oil" should be -- on --.
Line 42, "63" should be -- 68 --.

Column 7,
Lines 42, 43 and 45, "minor" should be -- mirror --.
Line 61, "mm/stop" should be -- turn/stop --.

Column 9,
Line 27, "requirements" should be -- requirement --.
Line 32, "seal" should be -- seat --.

Column 10,
Line 44, "or" should be -- of --.
Line 54, "cach" should be -- each --.

Column 12,
Line 2, "a" should be -- and --.
Line 4, "o" should be -- to --.
Line 15, "driver" should be -- driver-side --.

Signed and Sealed this

Second Day of May, 2006

JON W. DUDAS
*Director of the United States Patent and Trademark Office*